US009921117B2

(12) United States Patent
Warsaw

(10) Patent No.: US 9,921,117 B2
(45) Date of Patent: Mar. 20, 2018

(54) DYNAMOMETER FOR MEASURING POWER OUTPUT OF A PRIME MOVER DRIVING A ROTATING SHAFT HAVING PLURAL TORQUE DRIVE BARS ARRANGED AROUND AN OUTER PERIPHERY OF A STATOR PLATE

(71) Applicant: Aaron W. Warsaw, Rincon, GA (US)

(72) Inventor: Aaron W. Warsaw, Rincon, GA (US)

( * ) Notice: Subject to any disclaimer, the term of this patent is extended or adjusted under 35 U.S.C. 154(b) by 287 days.

(21) Appl. No.: 14/883,250

(22) Filed: Oct. 14, 2015

(65) Prior Publication Data

US 2017/0108388 A1    Apr. 20, 2017

(51) Int. Cl.
*G01L 3/18*    (2006.01)
*G01L 3/16*    (2006.01)

(52) U.S. Cl.
CPC ...................... *G01L 3/18* (2013.01)

(58) Field of Classification Search
CPC .... G01L 3/20; G01L 3/16; G01L 3/22; G01M 15/02; G01M 15/044; G01M 17/007; G06Q 30/06
See application file for complete search history.

(56) References Cited

U.S. PATENT DOCUMENTS

| 3,068,689 | A |  | 12/1962 | Warsaw |  |
|---|---|---|---|---|---|
| 4,062,233 | A |  | 12/1977 | Bonomo |  |
| 4,483,204 | A |  | 11/1984 | Warsaw |  |
| 4,899,595 | A |  | 2/1990 | Warsaw |  |
| 5,452,605 | A | * | 9/1995 | Wilson | G01L 3/22 73/116.06 |
| 6,860,145 | B2 | * | 3/2005 | Bergst | G01L 5/282 73/123 |

* cited by examiner

*Primary Examiner* — Harshad R Patel
*Assistant Examiner* — Brandi Hopkins
(74) *Attorney, Agent, or Firm* — Greer Burns & Crain, Ltd.

(57) ABSTRACT

A Prony brake used as a rotational load absorption unit, or dynamometer, to measure power output of a prime mover includes a cylindrical tube disposed within a sealed tank containing coolant water. Disposed within the cylindrical tube is a fixed stator shaft, which is attached to the center of a stator plate having its outer periphery disposed in closely spaced relation to the tube's inner surface, with the stator shaft further coupled to a hydraulic control system. Disposed within the stator plate's outer periphery are plural radially spaced pistons for applying a radially outward friction braking force to the inner surface of the rotating cylindrical tube. The stator shaft is provided with first and second ports and passageways for respectively transporting hydraulic control fluid and lubrication fluid. Also included is a supplemental cooling water supply wherein cooling water is circulated with the Prony brake by the rotating cylindrical tube.

26 Claims, 6 Drawing Sheets

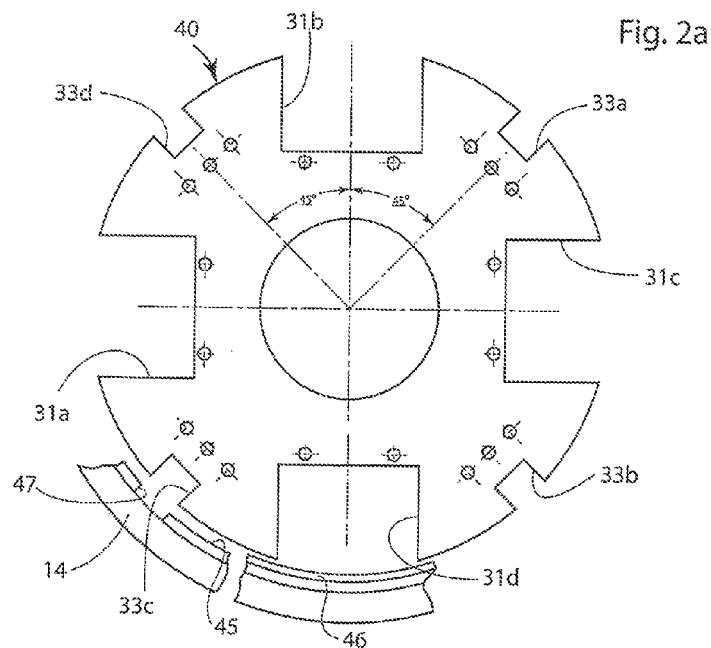
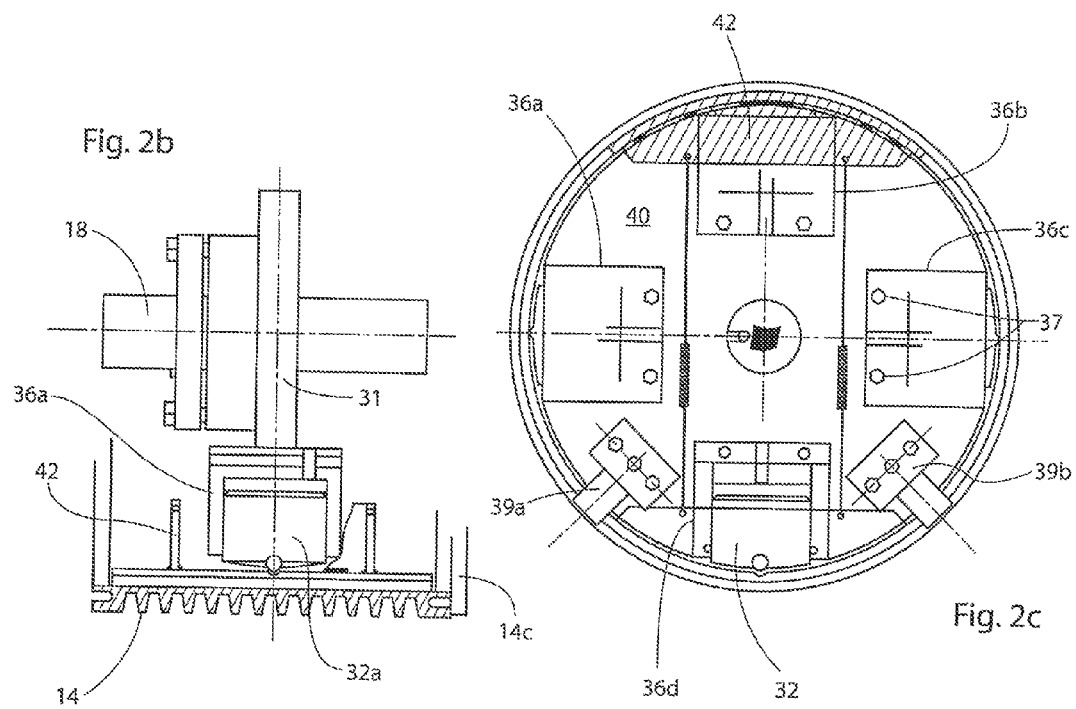

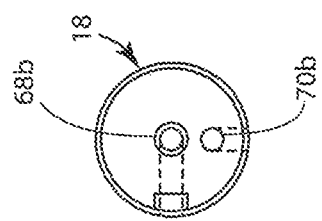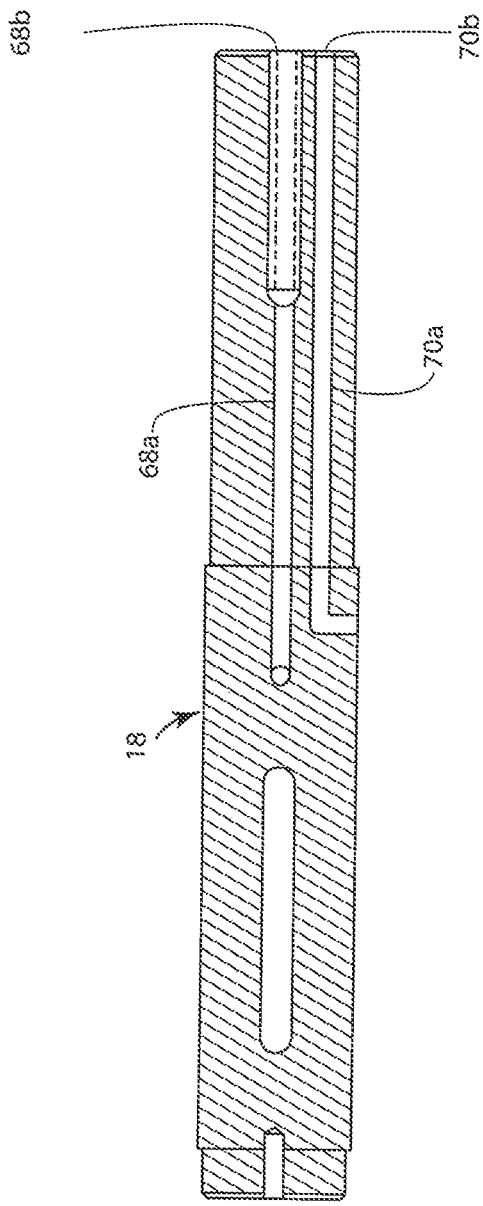

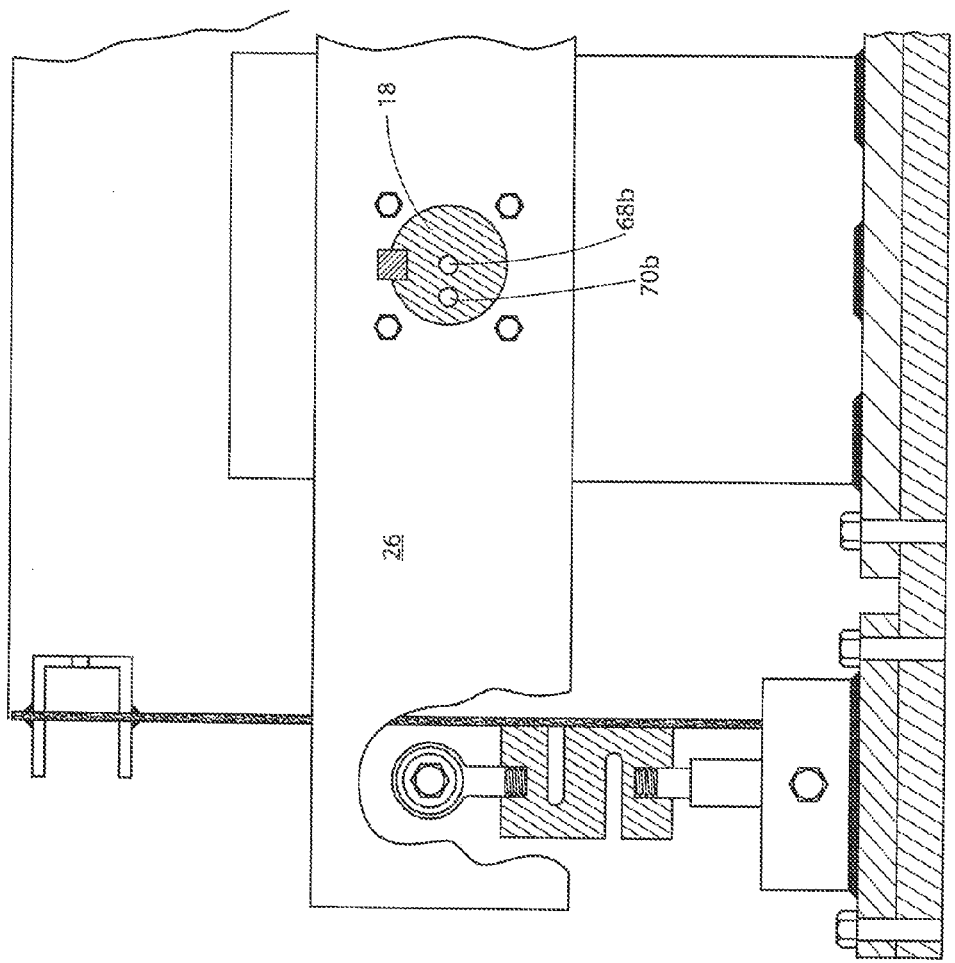
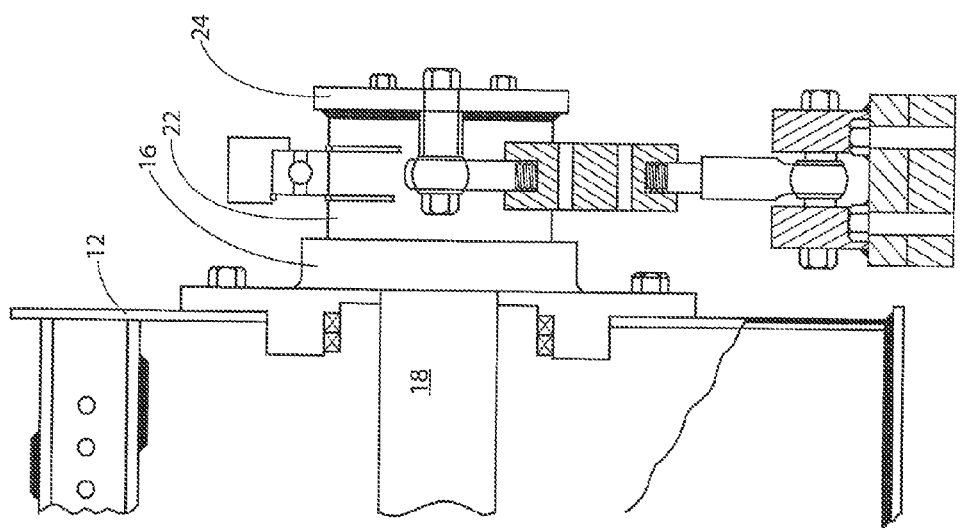

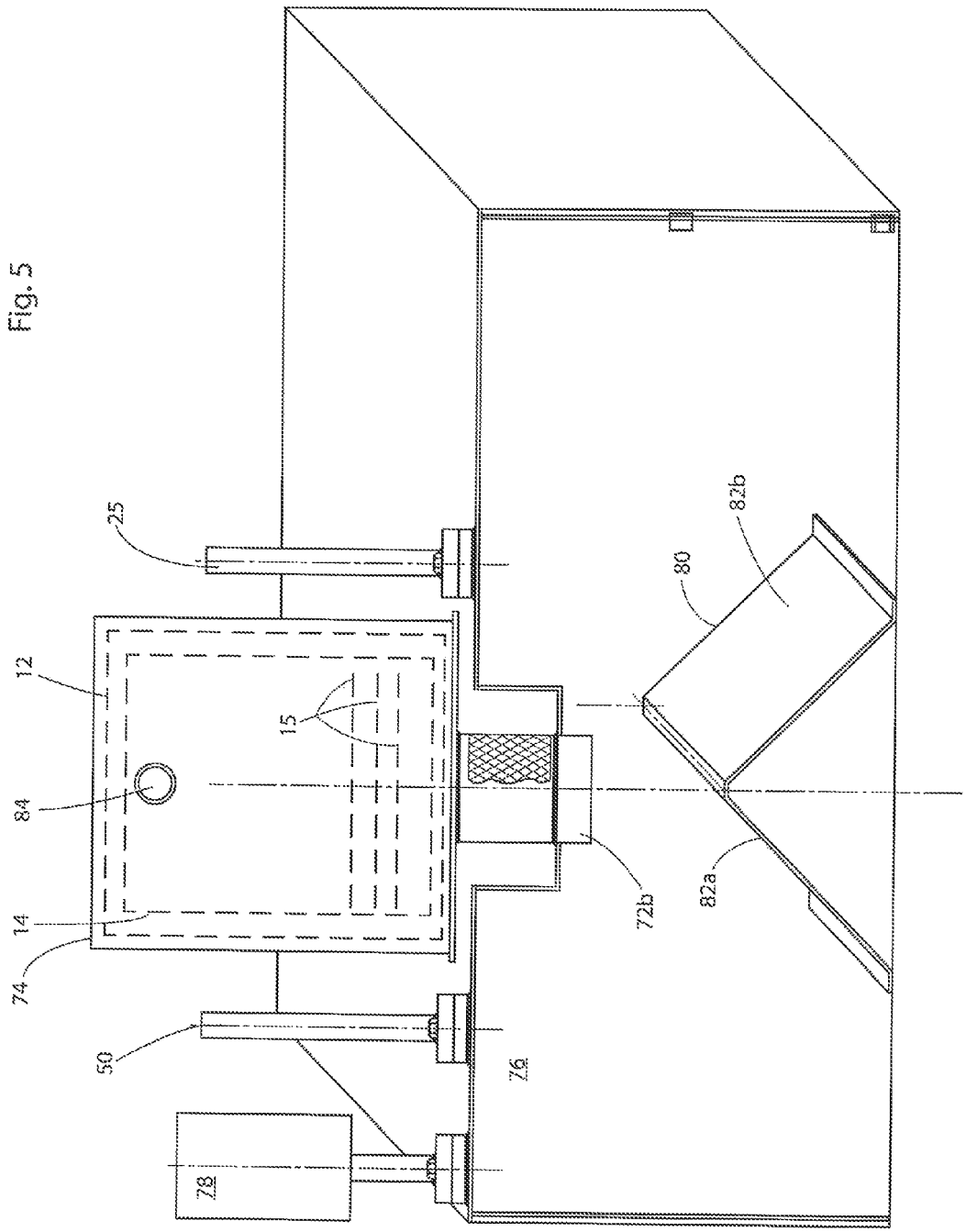

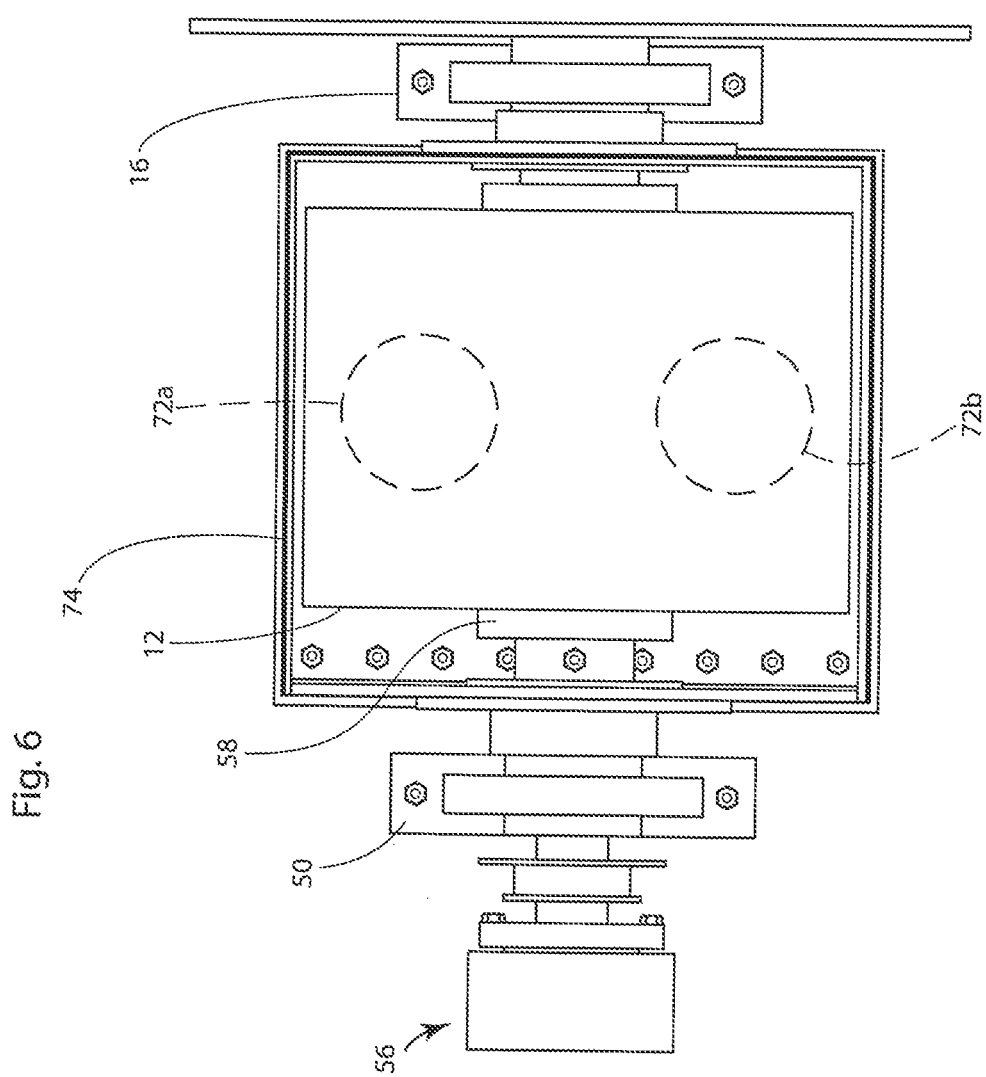

DYNAMOMETER FOR MEASURING POWER OUTPUT OF A PRIME MOVER DRIVING A ROTATING SHAFT HAVING PLURAL TORQUE DRIVE BARS ARRANGED AROUND AN OUTER PERIPHERY OF A STATOR PLATE

FIELD OF THE INVENTION

The present invention relates to rotational load absorption devices for precisely measuring the power output of a rotary prime mover, and is more particularly directed to an improved Prony brake-type load absorption device having a reduced number of components, offering simpler parts servicing and replacement, longer power measuring tests, and improved control and lubrication fluid access for servicing or replacement.

BACKGROUND OF THE INVENTION

A Prony brake generally includes a rotating brake drum or disc connected with the output shaft of a prime mover, such as an internal combustion engine, and stationary friction pads, or brake shoes, that are engageable with the drum or disc in applying a retarding force thereto by frictional contact. The degree of retarding action is dictated by the force with which this frictional contact is applied. A Prony brake as described may be used simply as a power absorption device or, in combination with torque measuring means, as a dynamometer for testing the under-load performance characteristics of the prime mover.

A brake's reactionary force on a prime mover can be expressed or measured in units of weight, be it pounds or kilograms. Reactionary forces are transferred through the brake's internal stationary stator section's shafts. An external extension of the rotary shaft connects to a stationary moment arm or to a fixed torque arm. A torque arm has a defined distance from the centerline of its stationary pivot to a point where the reactionary force is to be measured. This distance can be in inches, feet or in terms of a metric unit. Final measurement of torque is expressed in pounds and feet, i.e., lb/ft, or metric equivalent. Again, a Prony brake only establishes the force or torque reaction to which that force can be measured.

Once a desired torque load has been obtained and torque values have been observed or recorded, it is at that point in time that the operational speed, or rpm (revolutions per minute), must also be observed. With a known torque load (lb/ft) and the operational speed (rpm), output power, or horsepower, can be calculated. Horsepower is the product of torque (lb/ft)×rpm divided by a constant, i.e., 5252. It is at this point, that the device can be classified as a dynamometer.

All inherent reactionary forces both internal and external to the device must be measured accurately. These forces can be created by internal viscus oil shear, friction material drag, or external resistance to rotor travel through a cooling medium. Even though these forces may be small, they must be measured and accumulated in order to obtain maximum reaction force accuracy.

Through the years, Prony brakes have been associated with a brake drum. Brake drums are formed by pouring molten cast iron into a prefabricated sand casting mold. Wooden patterns or aluminum match plates required to make the mold are expensive and require maintenance from time to time. By using this type of casting process, impurities and imperfections are suspended in the casting. Other areas of concern are sand holes, gas holes, and hard spots within the casting. It is the goal that during the machining operations of the brake drum, these impurities and imperfections are removed. Impurities and imperfections at the point of friction can reduce friction material operating lifetime, as well as the life of the brake drum. Brake drums must also be free of porosities which could allow water to penetrate the internal chamber of the brake. Water, oil and friction brakes do not mix very well. Should the brake experience water infiltration, it will go through rapid changes in its coefficient of friction causing the unit to severely vibrate.

Finally, servicing and repair of Prony brakes over the years has been invasive and time-consuming. The performance of periodic, routine servicing of a typical Prony brake can easily extend over several hours, with multiple rotor brakes each requiring individual, independent servicing. For example, fresh maintenance fluid must be directed through each individual brake drum in cleaning or replenishing the maintenance fliud. The sampling of maintenance fluid currently involves a time consuming, invasive procedure, where the contaminated maintenance fluid typically finds its way to a lower brake drum water tank, and becomes mixed with the cooling water. This mixture of coolant water and used maintenance fluid is typically discharged to a drain or to the ground giving rise to pollution issues. The complex, invasive nature of these types of maintenance procedures gives rise to Prony brake low reliability and failures.

OBJECTS AND SUMMARY OF THE INVENTION

Accordingly, it is the object of the present invention to reduce dynamic vibration and movement of internal stator components such as encountered in prior art multi-drum Prony brakes, as well as to limit the axial length of the these types of Prony brakes.

It is another object of the present invention to reduce the number of potential areas for internal hydraulic oil leakage such as encountered in prior art high horsepower, high torque Prony brake, such as where O-ring hydraulic connectors are used at each splined shaft connection in multi-stator Prony brakes.

A further object of the present invention to reduce the mechanical stress on, the potential wear, and breakage to critical components such as splined and hydraulic connections in high horsepower, high torque Prony brakes.

A still further object of the present invention is to reduce the extent of heat retained by various components in a Prony brake, particularly in internal pilot bearings located on splined connectors.

Still another object of the present invention is to substantially reduce or eliminate the number of connecting lids secured by cap screws such as employed in multiple, or compound, brake drums.

Still another object of the present invention is to reduce the number of required service parts required in high horsepower, high torque Prony brakes.

Another object of the present invention is to provide increased torque measuring capacity as well as longer output power measuring and evaluation sessions for more accurate determinations.

A still further object of the present invention is to simplify and shorten the time required for regularly scheduled maintenance of Prony brakes, increase the reliability and operating lifetimes of Prony brakes, and render the operation and servicing of Prony brakes more environmentally clean and safe.

Briefly, the present invention contemplates a Prony brake having a single tubular stator shaft coupled to a single generally circular and planar stator plate with plural hydraulic piston bodies radially disposed in a spaced manner about its outer periphery to engage the inner surface of a rotating cylindrical tube rotationally displaced by a prime mover for measuring and recording the power output of the prime mover.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 2a is a plan view of a stator plate used in a preferred embodiment of the present invention;

FIG. 2b is a sectional view of a portion of the stator plate illustrated in FIG. 2a illustrating the hydraulic brake piston used therein;

FIG. 2c is a partial sectional view of the stator plate illustrated in FIG. 2a with various components located therein;

FIG. 3a is a longitudinal sectional view of a stator shaft employed in the Prony brake of the present invention;

FIG. 3b is a plan view of an end of a stator shaft illustrated in FIG. 3a;

FIG. 4a is a lateral sectional view of output end of the inventive Prony brake;

FIG. 4b is a partially cut-away plan view of the torque arm connection in the inventive Prony brake;

FIG. 5 is a combination perspective and plan view of the Prony brake system of the present invention incorporating additional cooling water reservoirs in accordance with another aspect of the present invention; and FIG. 6 is a top plan view shown partially in phantom of the inventive Prony brake incorporating the additional cooling water reservoirs shown in FIG. 5.

DETAILED DESCRIPTION OF THE PREFERRED EMBODIMENTS

Figure 1:
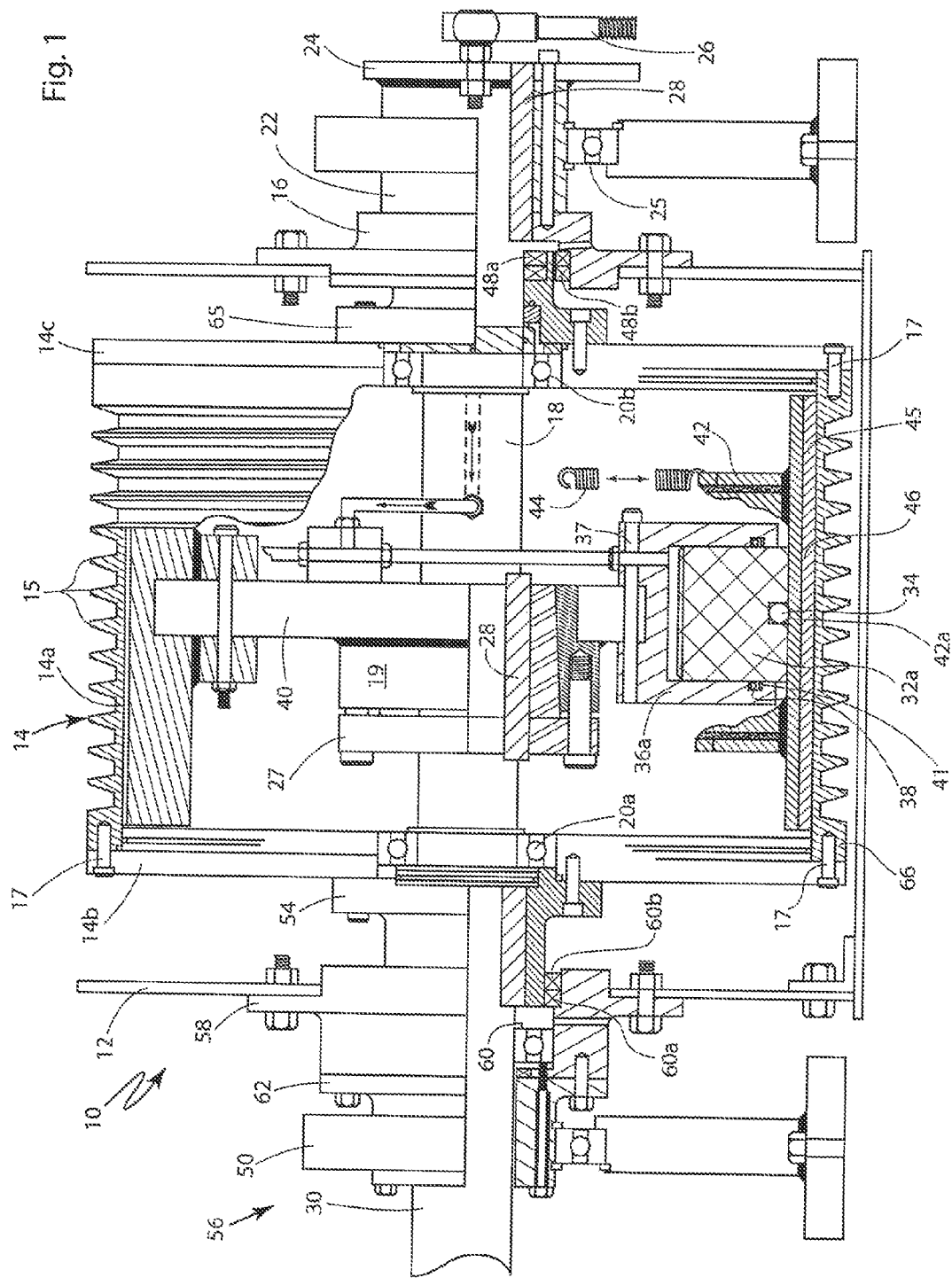
FIG. 1 is a longitudinal sectional view of a Prony brake in accordance with the present invention.

Referring to FIG. 1, there is shown a longitudinal sectional view of a Prony brake 10 in accordance with the principles of the present invention. Prony brake 10 includes a single rotor tube 14 preferably comprised of high quality cast iron formed by means of a centrifugal process. During the pouring process, a circular mold turns, or rotates, during the pour. This creates a centrifuge effect allowing impurities to consolidate on the outer nonfunctional diameter of the rotor tube 14. After machining the internal diameter, the rotor tube 14 is left with high quality material and the correct root means square (RMS) finish required at the point of friction. Using a rotor tube 14 allows for additional capacity expansion by merely cutting, or severing, the tube to a desired length without additional internal or connected external assemblies, where an increase in length allows for additional torque capacity expansion.

The cylindrical side wall 14a of rotor tube 14 is provided with plural spaced radial ribs 15 to facilitate heat transfer from the rotor tube 14 during braking. The open ends of rotor tube 14 are provided with respective first and second machine steel rotor end covers 14b and 14c secured to the rotor tube's lateral wall by means of plural cap screws 17. Each of the first and second rotor tube end covers 14b, 14c provides a double seal using viton O-rings to ensure retention of internal maintenance fluid and vapor, and to prevent water penetration into rotor rube 14. The first and second rotor end covers 14b, 14c are symmetrical in depth design, with the first rotor tube end cover disposed on the input-driven end of the Prony brake 10, while the second end cover 14c provides for retention of a rear rotor seal hub 65.

Prony brake 10 is coupled at its input end to a dynamic torque input shaft 30 (also referred to as rotating shaft) coupled to a prime mover (not shown for simplicity), the output power of which is to be measured. Prony brake 10 further includes a front input shaft assembly 56 coupled to and engaging the dynamic torque input shaft 30. The input end of Prony brake 10 also includes a steel tapered rotor hub 19 which is welded to a stator plate 40 and provides a common connection between the stator plate and a stator shaft 18 via a key 28. Torque, or drive force, is provided through key 28 and stator shaft 18 via a commercially available sure grip bushing and a tapered lock hub 27. Stator shaft 18 extends through the rotor tube front and rear covers 14b, 14c and rear rotor seal hub 65. Further reduction of internal components results from a completely new and unique method of mounting the four hydraulic 32a bodies 36a-36d to the steel stator plate 40 as shown in the sectional view of FIG. 2, with each piston body piloted and supported by the stator plate. Located 90° apart, each hydraulic piston body 36a-36d is cradled between precision machined slots in the stator plate 40 and is secured with cap screws 37. This arrangement also allows for individual replacement of a respective hydraulic brake piston 32 within each piston body, as shown in FIG. 2 for the case of piston 32 in piston body 36d. The internal working section of the Prony brake 10 requires just four piston bodies to provide approximately the same amount of ram, or hydraulic push, as sixteen hydraulic piston assemblies in the typical prior art Prony brake, or for the same torque and power capacity.

As shown in FIG. 2a, stator plate 40 is generally circular in shape and includes about its outer periphery four (4) spaced torque drive bar slots 33a-33d each adapted to receive a respective torque drive bar 39a-39d and four (4) hydraulic piston slots 31a-31d each adapted to receive a respective hydraulic piston body 36a-36d. Also shown in FIG. 2a is one of the slots 45 disposed between the outer surface of stator plate 40 and the inner surface of rotor tube 14, only a portion of which is shown in FIG. 2a. Disposed on the inner surfaces of rotor tube 14 are plural spaced recessed channels, where one of these channels is shown as element 47 in the figure. Each of the channels 47 permits the flow of the friction material 46 between the rotor tube 14 and the stator plate 40 as shown in FIGS. 2b and 2c.

This embodiment of the present invention also includes brake means including plural combinations of hydraulic pistons and pusher plates disposed in a spaced manner about said stator plate, wherein each hydraulic piston is adapted to engage and outwardly displace a respective pusher plate into engagement with an inner surface of said rotor tube in applying a braking force thereto. More specifically, as shown in FIG. 2c, the four hydraulic brake pistons 32a-32d and four hydraulic piston bodies 36a-36d are disposed in an equally spaced manner about the outer periphery of stator plate 40. Also shown in FIG. 2c for simplicity are only two torque drive bars 39a and 39b disposed in stator plate 40, it being understood that there are a total of four torque drive bars disposed in a spaced manner about the outer periphery of the stator plate. Each of the hydraulic piston bodies 36a-36d extends inwardly from the stator plate's outer periphery toward its center as shown in FIG. 2. Upon actuation of the Prony brake 10, each of its four pistons is urged radially outward within stator plate 40 and urges the fluid friction material 46 in each of the four (4) slots 45 disposed about the outer periphery of the stator plate into engagement with the inner surface of the rotating rotor tube 14. This action results in an outwardly directed braking force being applied to the rotor tube's circular inner surface. Each of the torque drive bars 39a-39d provides a respective stationary location for friction material disposed in a respective one of four (4) slots formed between the outer periphery of the stator plate 40 and the inner surface of rotor tube 14. As a torque load is produced by Prony brake 10, the reactionary braking force is transferred to each of the four torque drive bars. The force from all four (4) of the torque drive bars accumulates and is transferred to stator plate 40.

Referring to FIGS. 3a and 3b, there are respectively shown longitudinal sectional and end-on views of the fixed stator shaft 18 disposed within and extending the length of Prony brake 10. Stator shaft 18 includes first and second deep axial drilled slots 68a and 70a (also referred to as first and second internal conduits) each having a respective external port 68b and 70b disposed in an end of the stator shaft. The first and second external ports 68b, 70b provide external access to the internal portions of the Prony brake 10. The combination of the first slot 70a and first external port 70b is used for lubrication inspection, internal vapor pressure reference, and service of internal maintenance fluid. The combination of the second slot 68a and second external port 68b is adapted to receive hydraulic fluid for activating the brake pistons as discussed above.

All components of a stationary nature are disposed within rotor tube 14. Stator plate 40 is securely coupled to fixed stator shaft 18. These two components are mechanically connected using a tapered hub 27 and a common spline, or key, 28. Each end of stator shaft 18 is supported by a respective sealed bearing 20a and 20b disposed in a respective rotor cover plate 14b and 14c. Sealing of each of these end connections of stator shaft 18 requires a respective O-ring to ensure against the loss of maintenance fluid, as well as to protect against the penetration of water. The outer end of each of the hydraulic brake pistons 32a-32d receives a respective detent ball 34 as shown in FIG. 2c for establishing a seal between the hydraulic brake piston and an adjacent pusher plate 42 as shown in FIG. 1. Pusher plate 42 includes a recessed portion 42a for receiving the detent ball 34.

A respective formed fabricated metal pusher plate 42 shown in FIGS. 2b and 2c is associated with each of the hydraulic brake pistons 32a-32d and provides distribution of the hydraulic ram or push created by each hydraulic brake piston 32a as shown in these two figures as well as in FIG. 1. The outer portion of each pusher plate 42 has the same corresponding radius as the inside surface of the formed friction material 46 disposed between the outer surface of the pusher plate and the inner surface of rotor tube 14. The outside radius of the formed friction material liner 46 also matches the inside radius of rotor tube 14. Each of the four pusher plates 42 has a respective return spring 44 to return the pusher plate back to a neutral position after hydraulic pressure has been reduced or shut off.

Each of the hydraulic piston bodies 36a-36d are disposed in and secured to a respective cylindrical slot disposed in the outer periphery of stator plate 40 as shown in FIG. 2. Each hydraulic piston body 36a-36d contains a respective one of the four hydraulic brake pistons 32a-32d. In each of the hydraulic piston bodies 36a-36d are sealed with viton O-rings 38 and pressure back-up rings 41. Each of the four hydraulic piston bodies 36a-36d is hydraulically connected to the hydraulic service port within stator shaft 18 to permit the flow of hydraulic fluid required to actuate each of the four brake pistons 32a-32d.

The hydraulic brake assembly is installed in water tank 12 and is supported at each end of the tank. A stationary rear tank housing 16 provides support for stator shaft 18. Within rear tank housing 16 are a pair of high pressure water seals 48a and 48b for confining water within the outer water tank 12. A torque arm 26 is securely mounted to an end of stator shaft 18 and is attached to a stationary torque arm assembly 24 as supported by a cradle bearing assembly 25.

The front input shaft assembly 56 is comprised of dynamic torque input shaft 30 and drive hub 54 and is connected to a brake rotor cover assembly in the form of rotor tube end cover 14b. Front tank housing 58 provides a connection from the water tank 12 to a cradle bearing adapter 62. Front tank housing 58 contains a pair of high pressure water seals 60a and 60b to retain water in water tank 12. Also enclosed within the front tank housing 58 is a dynamic bearing 60 required to guide the dynamic torque input shaft 30 through the rotor tube's first end cover 14b. Connected to front tank housing 58 is the cradle bearing adaptor 62 which provides front tank support for the cradle bearing assembly 50. Cradle bearing adaptor 62 also serves a secondary purpose as the adjustment mechanism required to set the brake assembly into its final operational position within water tank 12.

Positioned on the dynamic torque input shaft 30 is a sprocket adaptor (not shown) to drive a chain driven hydraulic pump (also not shown). The sprocket adaptor also provides drive for a toothed magnetic pick-up wheel (also not shown) for magnetic pick-up impulse of rpm, or speed. By driving the hydraulic pump via the dynamic pump input shaft 30, control of the torque load is provided with a governor effect. This means that as torque load increases, the input speed slows down, and efficiency and oil volume of the hydraulic pump is reduced. This provides a buffer to reduce rapid overload or torque adjustments.

The hydraulic pressure source used with the present invention can be as simple as a pressure controlled valve, a hydraulic oil reservoir, or a hydraulic pump. A power source for the hydraulic pump can be chain driven by the dynamic torque input shaft 30 for the inventive Prony brake 10, or the pump may be driven by an electric motor. When the dynamic torque input shaft 30 is used, load control will have a governor loading effect. For example, when torque load is applied or increased, the input speed is reduced, or slows down. As input speed slows down, efficiency and the available oil volume of the pump is reduced. By reducing pump efficiency, hydraulic load control is very smooth and controllable. When the power source of Prony brake 10 is an electric motor, available hydraulic pressure is independent of input speed. This effect provides constant torque load control, with full torque loading starting at zero (0) RPM. Constant torque will work with engine or power take-off work, but is not recommended. Only a few applications, such as stall testing of hydraulic driven mechanical devices or a locked rotor on electric motors use constant torque for load control.

Braking is a function of controlling hydraulic pressure. Load is applied to achieve a desired amount of torque load against a prime mover. Control of load may also use a desired RPM of the prime mover by which the measurement of torque load at that speed is required. A pair of simple hydraulic needle valves are all that is required to provide control or regulation of pressure. These valves can be positioned in series with each other, with one valve flow used for control and the other valve flow for pressure regulation. Electric options for load control or speed control include PID servo systems and electric proportional hydraulic control valves. These systems are normally closed loop requiring feedback from some type of load cell or strain gauge. Also required is rpm feedback of the prime mover if only speed is to be controlled.

Hydraulic fluid under pressure is directed through the center of stator shaft 18 as discussed above, ending inside the hydraulic brake assembly, as the four brake pistons 32a-32d are connected in series with the stator shaft. As hydraulic pressure increases, brake piston push, or ram, increases proportionally to all four hydraulic brake pistons 32a-32d. The force created by the pistons is then transferred in an equal amount of ram through contact with each of the four (4) pusher plate 42, which, in turn, pushes on the friction material liner 46 disposed between the pusher plate and the inner surface of rotor tube 14. The outer radius of pusher plate 42 matches the inner radius of friction material liner 46. The outer radius of friction material liner 46 is the same as the inner radius of the brake rotor tube 14. It is very important to have the correct radius of each of the aforementioned mating components. Linear travel of brake piston 32a and all mating components is less than 0.125 inch from zero to high pressure.

The four friction material liners 46 are each contained between a pair of adjacent torque drive bars attached to and extending from the outer surface of stator plate 40 as shown in FIG. 2c for the first and second torque drive bars 39a and 39b. With each of the formed friction material liners 46 disposed between the outer rotor tube 14 and stator plate 40, the friction material liners float in the spaces between the rotor tube and stator plate. Thus, friction material liners 46 are not bonded or secured to any other structure. Under dynamic operation, static friction between the friction material liner 46 and an adjacent pusher plate 42 is greater than the dynamic friction between the friction material liner and the rotor tube's inner friction surface. Depending upon in which direction the rotor tube 14 is turning, the friction material liners 46 will contact either side of each of the torque drive bars 35a and 35b as shown in FIG. 2c. As working hydraulic pressure increases, the friction increases proportionally against the brake rotor tube 14. This increase in friction, in turn, creates resistance, or a load, against the prime mover rotationally displacing the rotor tube 14. This resistance force is transferred through each of the four torque drive bars to stator plate 40, and thence to stator shaft 18. Once transferred to the stator shaft 18, a resistance force, or torque load, can be measured via torque arm 26 as shown in FIGS. 4a and 4b. Once torque has been transferred to torque arm assembly 24, measurement of torque can be used either via a compression or tension type load cell (not shown). Typically these electronic load cells are Z,S beam or candle levered. These types of load cells are positioned at a fixed distance from the centerline of the stator shaft 18 and are mounted to the torque arm assembly 24. Analog readout of torque can be via a hydraulic pressure gauge, a hydraulic recording cylinder, or a charging supply pump. These measurements can be a direct torque measurement in terms of lb/ft, or as a sliding scale for power.

The preferred maintenance fluid in the subject invention is a silicon fluid, such as GE SF1153, which replaces prior petroleum synthetic oils. During fluid evaluation, it was discovered that a surplus of fluid would be required to protect the friction material and mating brake drum friction surfaces. It was determined that a dam formed in the lower pusher plate 42 by welding in a gusset allowed friction material fluid to flow to the rotating edge of the brake drum to splash around inside the drum to protect the drum frictional surfaces. The friction material acts as a filter together with some of the maintenance fluid to maintain the friction surfaces clean and free from glazing. The friction material served as the sacrificial component in the operation of the inventive Prony brake 10, as the friction material is normally a lower cost component. During development of this invention, its coefficient of friction was used as the only guidance as to the brake's internal condition during dynamic operation. The main success during operation was the fact that the coefficient of friction recovered from hot to cold temperatures.

Referring to FIG. 5, there is shown a partial perspective and partial plan view of a Prony brake in accordance with the present invention incorporating supplemental cooling water reservoirs, which view is also shown partially in phantom. A top plan view of the Prony brake arrangement shown in FIG. 5 is illustrated in FIG. 6. As described above, the Prony brake includes an inner rotor tube 14 disposed within a water tank 12, which are both shown in FIG. 5 in dotted line form. Rotor tube 14 includes plural spaced radial ribs, some of which are shown as elements 15 in FIG. 5, which are disposed about its outer lateral periphery and are aligned generally perpendicular to the longitudinal axis of the rotor tube. FIG. 5 also illustrates the input and output cradle bearing assemblies 50 and 25, as well as a power take-off shield 78 disposed adjacent the front input shaft assembly (not shown in FIG. 5 for simplicity) for protection purposes.

Additional Prony brake cooling water is provided by a large water reservoir in the form of a first upper supplemental cooling reservoir 74 and a second larger, lower supplemental cooling reservoir 76. Water tank 12 is disposed within the upper supplemental cooling reservoir 74 and is connected to the upper supplemental cooling reservoir for receiving cooling water therefrom. These water connections are conventional in design and are not shown herein for simplicity. Upper supplemental cooling reservoir 74 is coupled in a sealed manner to the lower supplemental cooling reservoir 76 by means of first and second flexible rubber boots 72a and 72b (also referred to as bi-directional flow means). Depending upon the direction of rotation of rotor tube 14, water flows from the upper supplemental cooling reservoir 74 via a first one of the flexible rubber boots to the lower supplemental cooling reservoir 76, and returns from the lower supplemental cooling reservoir to the upper supplemental cooling reservoir via the other flexible rubber boot. The water flows from the upper supplemental cooling reservoir 74 to the lower supplemental cooling reservoir 76 under the influence of gravity. In addition, the high speed rotation of the rotor tube 14 applies an additional force to the downward flow of the water into the lower supplemental cooling reservoir 76 to increase the rate of water circulation. Also, the high speed rotation of the rotor tube 14 exerts another force on the water in the form of drawing the water up through one of the flexible rubber boots from the lower supplemental cooling reservoir 76 to the upper supplemental cooling reservoir 74. This combination of forces applied to the circulating cooling water by rotor tube 14 increases water flow through the water cooling system and provides increased Prony brake cooling to more fully test the power for a more thorough and complete determination and analysis of the output power of a prime mover. Disposed in a lower portion of the lower supplemental cooling reservoir 76 is a baffle assembly 80 having first and second outer inclined walls 82a and 82b. Water discharged from one of the flexible rubber boots is incident upon the upper portion of the baffle assembly 80 with the first and second inclined walls 82a and 82b directing the water discharged into the lower supplemental cooling reservoir in opposite directions to more completely and efficiently circulate the cooling water within the lower supplemental cooling reservoir for enhanced Prony brake cooling. In addition, the weight of the increased water in the upper and lower supplemental cooling reservoirs provides increased ballast to increase the stability of the Prony brake during operation.

With the rotor tube 14 driven by the prime mover and with the upper supplemental cooling reservoir 74 filled with water, a natural resistance and associated rotational drag on the water are produced by the rotor's moving outer surface. This rotational drag produces a pumping action of the water as it travels around the outer surface of the rotor tube 14. Rotational drag in terms of power is a function of rotor speed, such that at 540 rpm the drag is approximately 7 horsepower, while 1,000 rpm produces approximately 25 horsepower. This circulating water power is used in this embodiment of the invention to circulate, or transfer, coolant from the upper supplemental cooling reservoir 74 to the lower supplemental cooling water reservoir, and vice versa. The rotational direction of the rotor tube 14 determines which side of the upper supplemental cooling reservoir 74 is circulated, or transferred, to the lower supplemental cooling reservoir 76 via one of the first or second flexible rubber boots 72a or 72b. The flexible rubber boot, which does not direct the water downward into the lower reservoir, then draws the water upward into the upper reservoir from the lower reservoir. A key element to increasing Prony brake cooling water efficiency is in the alignment of the centerline of the rotor tube 14 with the center of the coolant transfer ports in the form of the first and second flexible rubber boots 72a, 72b. This alignment position of the rotor tube 14 with respect to the first and second flexible rubber boots 72a, 72b also provides maximum rotor cooling at the point of friction, i.e., on the centerline of the above discussed pusher plate 42 relative to the point of highest friction in the friction material liner 46. The position and orientation of the baffle assembly 80 in the lower portion of the lower supplemental cooling reservoir 76 directs the flow of coolant within the lower supplemental cooling reservoir to achieve more uniform Prony brake cooling.

While particular embodiments of the present invention have been described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper prospective based on the prior art.

The invention claimed is:

1. A dynamometer for measuring the power output of a prime mover driving a rotating shaft comprising:
   a water tank containing coolant water;
   a generally cylindrical rotor tube extending through said water tank in a sealed manner and coupled to, for rotating with, said rotating shaft;
   a fixed stator shaft extending through said water tank and said rotor tube in a sealed manner;
   a disc-shaped stator plate fixedly attached to said stator shaft and disposed within said rotor tube;
   brake means disposed on an outer periphery of said stator plate and adapted to engage and exert a braking force on an inner surface of said rotating rotor tube;
   plural friction material liners disposed about and engaged by said brake means for engaging the inner surface of said rotor tube when said brake means exerts a braking force on said rotating rotor tube;
   plural torque drive bars disposed about the outer periphery of said stator plate in a spaced manner with one of the plural friction material liners disposed between and engaging a pair of adjacent torque drive bars, wherein resistance to rotation of said rotor tube by said brake means representing the output torque of the prime mover is transferred from said rotor tube via said friction material liners and said torque bars to said stator plate and stator shaft.

2. A dynamometer for measuring the power output according to claim 1, further comprising a torque arm attached to said stator shaft for measuring the output torque of the prime mover.

3. A dynamometer for measuring the power output according to claim 1, wherein said friction material liners are each in the form of a flowable suspension of low friction particles disposed in a lubricating fluid.

4. The dynamometer of claim 1, wherein said brake means includes plural combinations of hydraulic pistons and pusher plates disposed in a spaced manner about said stator plate, wherein each hydraulic piston is adapted to engage and outwardly displace a respective pusher plate into engagement with an inner surface of said rotor tube in applying a braking force thereto.

5. The dynamometer of claim 4, wherein each pusher plate has an outer curvilinear portion complementary in shape to the inner surface of said rotor tube for securely engaging the inner surface of said rotor tube.

6. The dynamometer of claim 5 further comprising plural piston bodies disposed in a spaced manner about the outer periphery of said stator plate, wherein each piston body is adapted to receive a respective hydraulic piston in a tight-fitting manner.

7. The dynamometer of claim 4 further comprising a hydraulic pressure source coupled to said hydraulic pistons, wherein said hydraulic pressure source is a pressure controlled valve, a hydraulic oil reservoir, or a hydraulic pump.

8. The dynamometer of claim 7, wherein said hydraulic pump is driven by the rotating shaft coupled to the prime mover to provide a governor effect whereby when a torque load to said rotor tube is applied or increased, input speed of said rotor tube is reduced.

9. The dynamometer of claim 1, wherein each of said friction material liners is in fluid form and is confined in a space between said stator plate and said rotor tube.

10. The dynamometer of claim 9, wherein each of said friction material liners includes plural friction particles suspended in a fluid.

11. The dynamometer of claim 10, wherein said friction material liners function as a filter to maintain friction surfaces of said stator plate and said rotor tube clean and free from glazing.

12. The dynamometer of claim 1, wherein said stator shaft includes first and second internal conduits respectively coupled to an external source of service/maintenance fluid and to a hydraulic fluid source for cooling said stator shaft and for actuating said brake means, respectively.

13. A dynamometer for measuring the power output of a prime mover driving a rotating shaft comprising:
 a water tank containing coolant water;
 a generally cylindrical rotor tube extending through and coupled to said water tank in a sealed manner, wherein said rotor tube is coupled to, and rotates with, said rotating shaft;
 a fixed stator shaft extending through said water tank and disposed within and along the length of said rotor tube;
 a disc-shaped stator plate fixedly attached to said stator shaft and disposed within said rotor tube; and
 hydraulically actuated brake means disposed on an outer periphery of said stator plate and adapted to engage and exert a braking force on an inner surface of said rotating rotor tube;
 wherein said stator shaft includes first and second internal conduits respectively coupled to an external service/maintenance fluid access port and to said stator shaft as well as to a source of hydraulic fluid under pressure, wherein said second internal conduit is also coupled to said brake means for actuating said brake means and applying a braking force on said rotating rotor tube.

14. The dynamometer of claim 13, wherein each of said first and second conduits includes a respective input port and a respective output port, and wherein each input port is disposed on an end of said stator shaft and each output port is disposed on a lateral portion of said stator shaft along the length thereof.

15. A dynamometer for measuring the power output of a prime mover driving a rotating shaft comprising:
 a generally cylindrical rotor tube coupled to and rotating with said rotating shaft;
 brake means disposed adjacent to said rotor tube and adapted to engage and exert a braking force on an inner surface of said rotating rotor tube;
 a closed water system disposed about and in contact with said rotor tube for cooling said rotor tube, wherein said water system includes a first primary portion disposed about said rotor tube and a second supplemental portion connected to said first primary portion, wherein water is circulated between said first primary portion and said second supplemental portion of said closed water system by said rotor tube for cooling the dynamometer.

16. The dynamometer of claim 15 further comprising bi-directional flow means disposed between said first primary portion and said second supplemental portion of said water system and adjacent to said rotor tube.

17. The dynamometer of claim 16, wherein the first primary portion and said second supplemental portion of said water system respectively include first primary and second supplemental sealed water reservoirs coupled together by means of said bi-directional flow means in a sealed manner.

18. The dynamometer of claim 17, wherein said bi-directional flow means includes first and second conduits each coupled to said first primary sealed water reservoir and said second supplemental sealed water reservoir in a sealed, spaced manner.

19. The dynamometer of claim 18, wherein the water flows from said first primary sealed water reservoir to said second supplemental sealed water reservoir via said first conduit and from said second reservoir to said first reservoir via said second conduit.

20. The dynamometer of claim 19, wherein each of said first and second conduits includes a respective generally cylindrical flexible rubber boot.

21. The dynamometer of claim 17, wherein said second supplemental water reservoir includes an inner baffle arrangement disposed within the flow of water within said second supplemental water reservoir for thoroughly mixing the circulating water.

22. The dynamometer of claim 21, wherein said inner baffle arrangement is disposed in a lower portion of said second supplemental sealed water reservoir and includes first and second outer inclined walls for deflecting the water directed into said second water reservoir in first and second opposed directions.

23. The dynamometer of claim 17, wherein rotational drag of a first portion of the rotor tube's outer surface on the cooling water in said first water reservoir directs the water through said bi-directional flow means into said second water reservoir, and a second portion of the rotor tube's outer surface draws water from said second water reservoir into said first water reservoir in circulating water between said first and second water reservoirs.

24. The dynamometer of claim 15, wherein said second supplemental portion has a larger water capacity than said first primary portion.

25. The dynamometer of claim 15, wherein said first portion of said water system is coupled to a source of water to allow for adding water to the closed water system.

26. The dynamometer of claim 15, wherein said rotor tube includes plural elongated, generally linear ribs disposed in a spaced manner about the outer periphery of said rotor tube and aligned with the axis of rotation of said rotor tube for increased mixing and circulation of the cooling water.

* * * * *